United States Patent [19]

Bulman et al.

[11] 4,030,371
[45] June 21, 1977

[54] GYROSCOPIC APPARATUS

[75] Inventors: David Nicholas Bulman, Fairford; Leonard Maunder, Newcastle-upon-Tyne, both of England

[73] Assignee: National Research Development Corporation, London, England

[22] Filed: Sept. 26, 1975

[21] Appl. No.: 617,162

[30] Foreign Application Priority Data

Oct. 9, 1974  United Kingdom ............ 43743/74

[52] U.S. Cl. .................................. 74/5 F; 74/5 R; 74/5.7; 74/572
[51] Int. Cl.[2] ...................................... G01C 19/02
[58] Field of Search ............... 74/5 F, 5 R, 5.7, 572

[56] References Cited

UNITED STATES PATENTS

| | | | |
|---|---|---|---|
| 1,902,505 | 3/1933 | Johnson | 74/572 |
| 3,211,011 | 10/1965 | Litty | 74/5 F |
| 3,529,477 | 9/1970 | Quermann | 74/5 F |

FOREIGN PATENTS OR APPLICATIONS 1,304,571  1/1973  United Kingdom

*Primary Examiner*—Samuel Scott
*Assistant Examiner*—Randall Heald
*Attorney, Agent, or Firm*—Cushman, Darby & Cushman

[57] ABSTRACT

Gyroscopic apparatus in which the rotor is elastically-connected to its drive, whereby deflection of the rotor bends the connection and thus sets up a deflection torque which acts upon the rotor. The connection of the rotor to the drive also includes masses carried by springs. When the rotor deflects, these masses oscillate in directions parallel to the driving axis, and when the rotor is spinning at a certain (tuning) speed the sum of the oscillating forces exerted upon the rotor by the individual moving masses will be a steady quantity which may be made equal and opposite to the deflection torque. The apparatus may thus behave like a "free rotor" gyroscope.

8 Claims, 6 Drawing Figures

GYROSCOPIC APPARATUS

This invention relates to gyroscopic apparatus, and in particular to gyroscopes comprising a rotating sensing element, or rotor, which is elastically attached to the driving shaft or other means by which it is made to rotate. The invention relates particularly to a method of making such a gyroscope so that it behaves comparably to a free-rotor gyroscope.

In a true free-rotor gyroscope, to which many approximations have been attempted, the rotor is mounted and driven in such a way that if the body on which the gyroscope is mounted is subjected to a rate of turn about an axis lying normal to the spin axis of the rotor, the resulting movement of the support relative to its rotor gives rise in practice to minute external torque upon the rotor, and in theory to no such torque at all. The consequence of such absence of torque is that when the rotor and its housing move relative to each other in response to the rate of turn the angular disposition of that relative movement at once indicates the axis of the turn, and the rotor remains in a plane in space parallel to the one in which it originally lay. Thus the free-rotor gyroscope has properties that readily allow it to be used as the basis for rate-of-turn indicators, north-seeking instruments, inertial navigation platforms and many other navigation and surveying devices. Unfortunately the necessary freedom of movement of the rotor within its housing can only be achieved by expensive manufacture involving very clean conditions and very close tolerances, and the electromagnetic and other drives necessary to spin the rotor without direct physical contact pose similar difficulties.

Elastically-supported gyroscopes now well known are far simpler and cheaper to make and operate than free-rotor gyroscopes. Furthermore, although their indication of some parameters is not as direct and simple to read as that of an accurate free-rotor gyroscope, they readily indicate rate of turn about an axis normal to the spinning axis of their rotor. However, many of the elastically-supported gyroscopes already commonly used have comprised a rotor free to rotate along only one of the axes lying normal to the spin axis of the rotor drive. Should such a gyroscope be subjected to a rate of turn about an axis lying in a plane normal to the drive axis, the rotor of course cannot take up a new position in which it lies in a single plane inclined to its original one; it can only oscillate about its single axis, in a manner which can sometimes be interpreted to indicate the rate and extent of the turn. In order to be comparable with a free-rotor gyroscope, the rotor of an elastically-supported gyroscope must at least be able to turn about two axes, mutually at right angles and each at right angles to the drive axis.

In another known type of elastically-supported gyroscope in which the rotor can turn about the two axes just described, the rotor is supported from its drive shaft by a Hooke's joint in which the usual pivots have been replaced by torsion springs. In such a design, however, with an intermediate member between the rotor and the drive shaft, the diametrical support of the rotor necessarily means that the rotor suspension is asymmetrical, that is to say the relation of the rotor and its suspension to one of the two axes that lie normal to each other and to the spinning axis is different from the setting relative to the other of these two. Studies have suggested that although one or more rotor speeds can often be found at which a condition of some resonance is set up and the resulting forces tend to counteract the unwanted torques exerted upon the rotor by its suspension, nevertheless some residual torque must always exist.

The applicants are aware of other kinds of gyroscopic apparatus, of which U.S. Pat. No. 3,211,011 and U.K. Pat. specification No. 1,304,571 show two examples, in which the rotor is supported elastically and more truly symmetrically than in either of the more common examples just discussed. Each of these examples shows a design of gyroscope including devices that act so that when the rotor tilts about the drive axis, a mechanical compensation is set up so that the undesired spring rate exerted upon the rotor by its deflected elastic suspension is offset and apparently reduced to zero. However in U.S. Pat. No. 3,211,011 the way the masses are mounted prevents them from making substantial movements in a direction parallel to the axis of the rotor drive, and the mechanical compensation is said to rely upon the centrifugal forces exerted by masses suspended between the rotor and the driving element within linkages of two struts, these struts lying at right angles to each other. Such arrangements of struts are difficult to assemble and set up accurately, in particular because of the toggle action of the strut through which the centrifugal force of each weight is transmitted to the rotor. Moreover each strut is weakened by necked-down portions where it will be subjected to continual bending in opposite senses and thus liable to fatigue. The construction is also subject to additional dynamic effects because of the radial motion of the masses. This radial motion produces accelerations which act tangentially to the arc of spin, and this in turn produces additional unwanted oscillatory forces on the struts.

The construction shown in U.K. Pat. specification No. 1,304,571 is totally independent of rotor speed, and also relies on a toggle-type action.

The present invention is defined by the claims at the end of this specification and examples of it will now be described, by way of example, with reference to the accompanying drawings in which:

Figure 1:
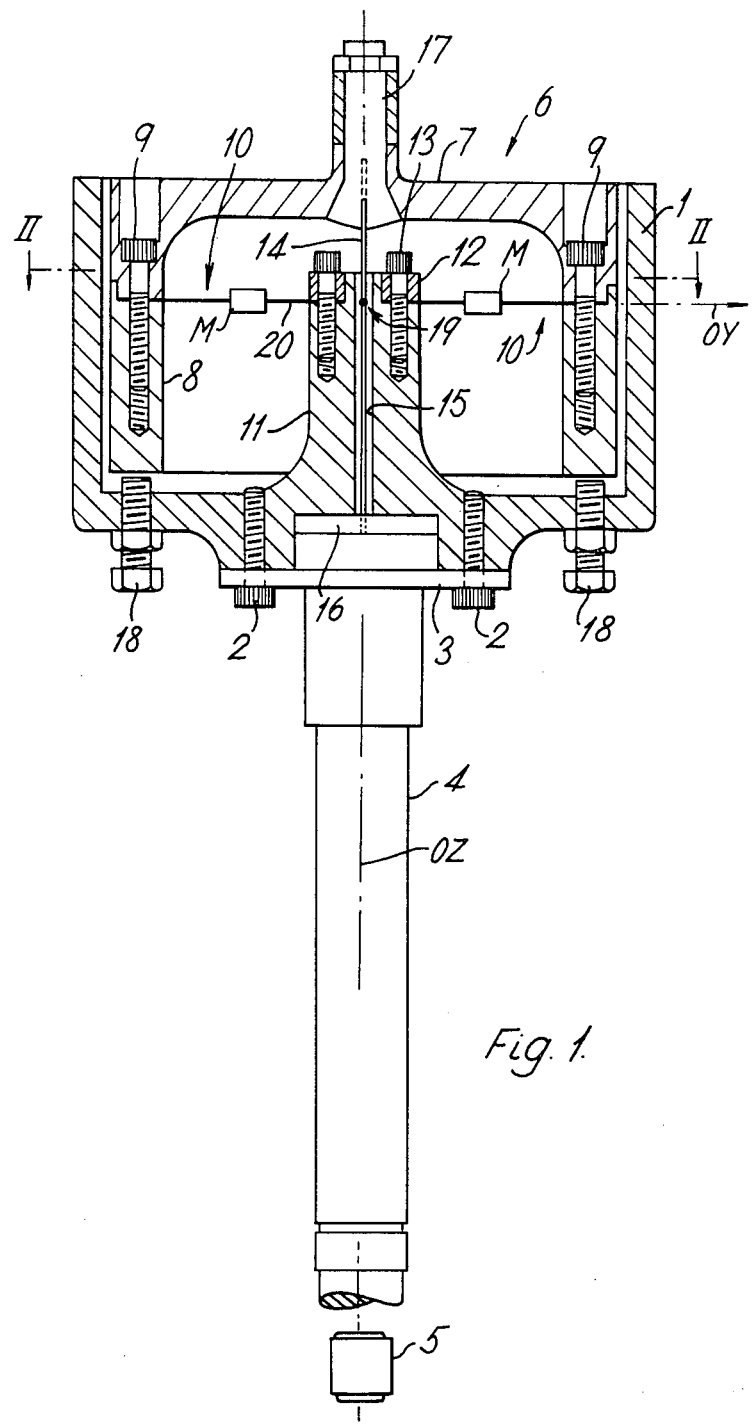
FIG. 1 is an axial section through a gyroscope according to the invention.
Figure 2:
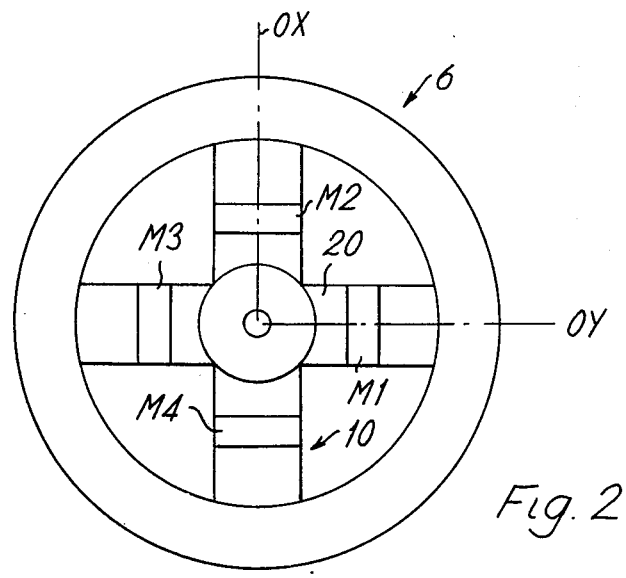
FIG. 2 is a diagrammatic radial section on the line II—II in FIG. 1.
Figure 3:
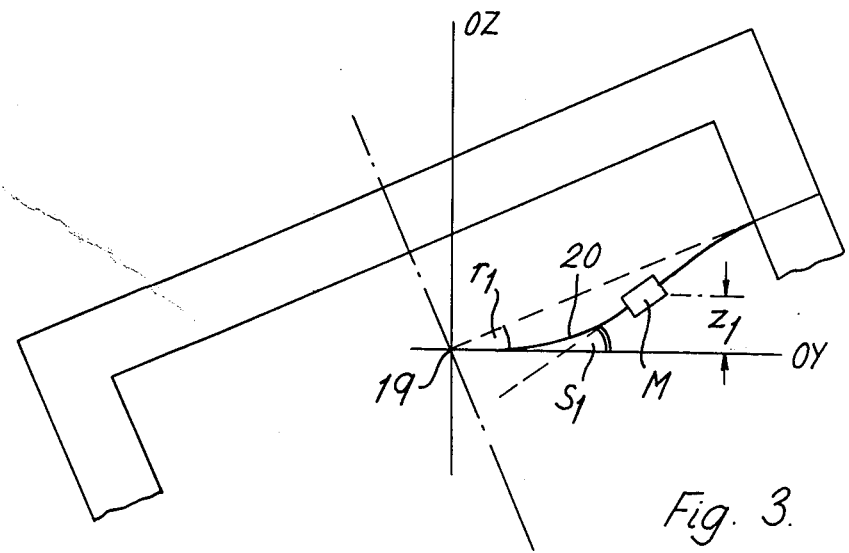
FIG. 3 is a diagrammatic and partial view illustrating the behaviour of a vibrating mass in the gyroscope of FIG. 1.

The elastically-supported gyroscope shown in FIGS. 1 to 3 comprises a driving element including a rotor housing 1 attached by screws 2 to a plate 3 carried by a drive shaft 4 driven by a motor shown diagrammatically at 5. A rotor 6 comprises a front part 7 and a rear part 8 held together by screws 9. The rotor is connected to the drive shaft in two ways. Firstly by four mass-carrying structures in the form of radial spokes 10; the radially-inward end 20 of each spoke is clamped to a central pillar 11 of housing 1 by a clamp ring 12 and screws 13, and the radially-outward end of each spoke is clamped to the rotor between parts 7 and 8.

The four spokes are formed by stamping blanks from a single sheet of thin metal to leave a cruciform shape; each spoke thus has low resistance to bending about axes lying in the plane of its own surface. Secondly by a support bar 14 lying along the axis of shaft 4; much of the length of this bar lies within a passage 15 formed within pillar 11, one end of the bar is clamped to a plate 16 anchored to housing 1, and the other end of the bar is clamped to a collet 17 located at the center of part 7 of rotor 6. If rotor 6 begins to spin seriously out-of-true, the base of rear part 8 makes contact with stop screws 18 mounted in housing 1.

Support bar 14 should be designed to be strong in tension and as strong as possible in compression, so as to give rotor 6 positive axial location within housing 1, but should be as weak as possible in flexure so as to exert the minimum restoring torque upon the rotor whenever, in operation, its spin axis moves out of coincidence with the axis of shaft 4 and intersects it instead. The apparatus is balanced so that the center of gravity of the rotor lies at point 19, i.e. in the plane of the four spokes 10 and on the driving axis of the shaft 4. Each spoke carries a mass M at a point along its length that is not critical but should be sufficiently close to the pillar 11 that the part of the spoke lying between the mass and the pillar is stiff in torsion. The masses M may well be identical, but for ease of description they are indicated in FIG. 2 as $M_1$, $M_2$, $M_3$, $M_4$. The three principal axes of the apparatus OX, OY and OZ are shown; OZ coincides with the axis of shaft 4, and OX and OY are mutually at right angles and both at right angles to OZ.

In normal operation of the gyroscope shown in FIGS. 1-3 the rotor spins in the X-Y plane as shown in FIG. 1 and the spokes 10 and their carried masses M lie in this plane also. Say now the gyroscope is subjected to a rotation about OX. The partial view of FIG. 3 shows the effect of this upon the rotor, one of the spokes 10 and its attached weight ($M_1$) at an instant during such rotation. In particular the weight $M_1$ has moved, in a direction substantially parallel to OZ, to a position defined by $z_1$ and $s_1$. At this instant the part of the rotor to which the spoke is attached lies in the positive quadrant of the OYZ plane, and the greater part of the length of the spoke lies in a curve instead of on the direct radius between the origin O and the rotor. Parameters $r_1$, $s_1$ and $z_1$ are marked on the Figure. Similar parameters but with the subscripts 2, 3 and 4 will apply at the same instant to the other three spokes and their attached weights, which likewise will not coincide with their respective direct radii. However, the relative positions of the other three spokes and their respective radii will of course be different, on account of the asymmetric position that the rotor has taken up.

In this situation, the externally applied torques upon the rotor can be written $$K_z \cdot z_1 + K_s \cdot s_1 - 2K_r \cdot r_1 - K_b \cdot r_1 - K_t \cdot r_1 - K_z \cdot z_3 + K_s \cdot s_3 \quad \text{(i)}$$

about OX, and $$-K_z \cdot z_2 + K_s \cdot s_2 - 2K_r \cdot r_2 - K_b \cdot r_2 - K_t \cdot r_2 + K_z \cdot z_4 + K_s \cdot s_4 \quad \text{(ii)}$$

about OY, where $K_z$, $K_r$ and $K_s$ are spring constants for a single spoke, $\frac{1}{2}K_t$ is the torsional stiffness of the outer part of each spoke, and $K_b$ is the stiffness of the center support bar.

If the external torques upon the rotor are to sum to zero, then equations (i) and (ii) can be re-written as $$r_1 \cdot (2K_r + K_b + K_t) = K_z \cdot z_1 + K_s \cdot s_1 - K_z \cdot z_3 + K_s \cdot s_3 \quad \text{(iii)}$$

and $$r_2 \cdot (2K_r + K_b + K_t) = -K_z \cdot z_2 + K_s \cdot s_2 + K_z \cdot z_4 + K_s \cdot s_4 \quad \text{(iv)}$$

For the condition in which the spin axis of the rotor remains parallel to its original setting it will be apparent that $r_1$ may be written as $(H)\cos nt$ and $r_2$ as $-(H)\sin nt$, $(H)$ representing a deflection of the gyroscope about axis OX, and $n$ being the spin velocity of the rotor about OZ.

The relationship given by equations (iii) and (iv) must be satisfied if the rotor is to behave as a free rotor, and the gyroscope can thus act as a free rotor gyroscope. The equations of motion of the masses $M_1$ to $M_4$ must therefore be found and compared with equations (i) to (iv) to see if they can be made compatible.

Let $M_1$ have principal axes $O'u$, $O'v$ and $O'w$ along which lie the principal moments of inertia $a$, $b$ and $c$ respectively. Also, when $s_1 = O = z_1$, let $O'u$, $O'v$ and $O'w$ be aligned in the directions OX, OY and OZ respectively, thus defining the position of $O'$. The angular velocities of the mass about its principal axes can now be written as:

$\dot{s}_1$ about $O'u$
$n \cdot \sin s_1$ about $O'v$ and $n \cdot \cos s_1$ about $O'w$ and the inertial torque of the mass about $O'u$ is:

$$a\ddot{s}_1 - (b-c)n^2 \cos s_1 \cdot \sin s_1$$

If small angles of deflection are assumed such that $\cos s_1$ is nearly equal to unity and $\sin s_1$ to $s_1$, this torque may be written $$a\ddot{s}_1 + (c-b)n^2 \cdot s_1 \quad \text{(v)}$$

The external torque on mass $M_1$ can be written as $$K_{mz} \cdot z_1 - K_{ms} \cdot s_1 + K_{mr} \cdot r_1 \quad \text{(vi)}$$

where $K_{mz}$, $K_{mr}$ and $K_{ms}$ will be explained but are related to the bending moments and shear forces at the ends of the spoke, the latter being treated as two springs carrying the mass M between them, and by equating expressions (v) and (vi) and writing the similar equations for $M_2$, $M_3$ and $M_4$, the following expressions are obtained:

$$K_{mz} \cdot z_1 - K_{ms} \cdot s_1 + K_{mr} \cdot r_1 = a\ddot{s}_1 + (c-b)n^2 \cdot s_1 \quad \text{(vii)}$$
$$-K_{mz} \cdot z_2 - K_{ms} \cdot s_2 + K_{mr} \cdot r_2 = a\ddot{s}_2 + (c-b)n^2 \cdot s_2 \quad \text{(viii)}$$
$$-K_{mz} \cdot z_3 - K_{ms} \cdot s_3 + K_{mr} \cdot r_1 = a\ddot{s}_3 + (c-b)n^2 \cdot s_3 \quad \text{(ix)}$$
$$K_{mz} \cdot z_4 - K_{ms} \cdot s_4 - K_{mr} \cdot r_2 = a\ddot{s}_4 + (c-b)n^2 \cdot s_4 \quad \text{(x)}$$

By also considering the motion of the masses in the OZ direction we may write:

$$-K_{pz} \cdot z_1 + K_{ps} \cdot s_1 + K_{pr} \cdot r_1 = m\ddot{z}_1 \quad \text{(xi)}$$
$$-K_{pz} \cdot z_2 - K_{ps} \cdot s_2 - K_{pr} \cdot r_2 = m\ddot{z}_2 \quad \text{(xii)}$$
$$-K_{pz} \cdot z_3 - K_{ps} \cdot s_3 - K_{pr} \cdot r_1 = m\ddot{z}_3 \quad \text{(xiii)}$$
$$-K_{pz} \cdot z_4 + K_{ps} \cdot s_4 + K_{pr} \cdot r_2 = m\ddot{z}_4 \quad \text{(xiv)}$$

Here $K_{pz}$, $K_{pr}$ and $K_{ps}$, which will also shortly be explained, are stiffness constants related to mass force in the OZ direction in the same way that $K_{mz}$ etc. were related to mass torque, and $m$ is the mass of $M_1$.

Equations (vii) to (x) and (xi) to (xiv) are the equations of motion of the four masses, and if the rotor is to be tuned these must be compatible with equations (iii) and (iv). It may reasonably be assumed from the symmetrical nature of the gyroscope that $s_1 = s_3$, $s_2 = s_4$, $z_1 = -z_3$ and $z_2 = -z_4$, and that $s_1$, $z_1$ etc. have a sinusoidal motion of frequency $n$. Equations (iii), (vii) and (xi) may now be combined, writing $s_1 = s_0 \cdot \cos nt$ and $z_1 = z_0 \cdot \cos nt$, to yield:

$$K_{mz} \cdot z_o - K_{ms} \cdot s_o + \frac{K_{mr}(2k_z \cdot z_o + 2K_s \cdot s_o)}{(2K_r + K_b + K_t)} = -an^2 s_o + (c-b)n^2 s_o \quad (xv)$$

and $$-K_{pz} \cdot z_o + K_{ps} \cdot s_o + \frac{K_{pr}(2K_z \cdot z_o + 2K_s \cdot s_o)}{(2K_r + K_b + K_t)} = -mn^2 z_o \quad (xvi)$$

and these equations can be mathematically satisfied if:

$$n^4(a+b-c).m + n^2 \left\{ (c-a-b)\left(K_{pz} - \frac{2K_z \cdot K_{pr}}{K_{rbt}}\right) - m\left(K_{ms} - \frac{2K_{mr} \cdot K_s}{K_{rbt}}\right)\right\} \ldots$$

$$\ldots + \left\{ \left(K_{ms} - \frac{2K_{mr} \cdot K_s}{K_{rbt}}\right)\left(K_{pz} - \frac{2K_z \cdot K_{pr}}{K_{rbt}}\right) - \left(K_{ps} + \frac{2K_s \cdot K_{pr}}{K_{rbt}}\right)\left(K_{mz} + \frac{2K_{mr} \cdot K_z}{K_{rbt}}\right)\right\} = 0$$

where $K_{rbt} = (2K_r + K_b + K_t)$. (xvii)

In equations (vi) to (xvii) $K_z$, $K_r$ and $K_s$ are constants defining the torque applied to the rotor by the spoke about the OX axis for unit change in $z$, $r$ or $s$ respectively: $K_{mz}$, $K_{mr}$ and $K_{ms}$ are constants defining the torque transmitted to the mass by the spoke about the O'u axis for unit change in $z$, $r$ and $s$ respectively, and $K_{pz}$, $K_{pr}$ and $K_{ps}$ are constants defining the force transmitted to the mass by the spoke along the OZ axis for unit change in $z$, $r$ and $s$ respectively.

Equation (xvii) results from a consideration of previous equations concerning the behaviour of mass $M_1$, but exactly the same equation results from like treatment of the corresponding previous equations concerning the behaviour of the other masses. Solution of equation (xvii) thus yields a certain rotor speed $n$ in which the continuously oscillating forces generated by the individual masses $M_1$ to $M_4$ yield a steady sum which, in theory, exactly offsets any externally-applied torque to which the rotor is subjected by reason of deflection from its normal spinning position. The rotor will thus behave in a manner comparable to that of a free rotor. The formulae given suggest that in typical apparatus as shown in FIGS. 1 to 3, in which the spokes 10 have a width of ⅜ inch and a total length of 1 inch and their thickness is of the order of 0.005 inches, in which the length of their inner part 20 varies in the range ⅛ to ¼ and the radial length of the part of the weight actually attached to the spoke is ⅛ inch, a tuning condition can be obtained in each case at a shaft speed lying within the range 4,500–14,000 r.p.m.

Figure 4:
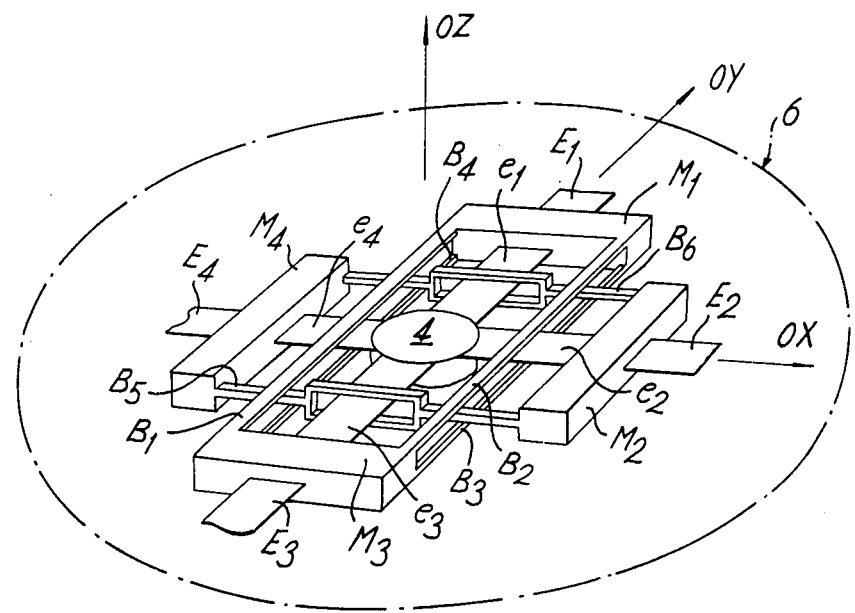
FIG. 4 is a diagrammatic perspective view of part of another gyroscope.

In the alternative apparatus shown diagrammatically in FIG. 4 a central support bar, similar to item 14 of previous Figures, exists but is not shown. Masses $M_1$ and $M_3$ are solidly connected by bars $B_1$, $B_2$, $B_3$ and $B_4$ and masses $M_2$ and $M_4$ are similarly connected by bars $B_5$ and $B_6$. Masses $M_1$ to $M_4$ are connected to the rotor by elastic members $E_1$ to $E_4$ respectively; these elastic connections allow movement of the joint mass $(M_1 + M_3)$ about the OX axis and the joint mass $(M_2 + M_4)$ about the OY axis. It will also be apparent that if the masses are held fixed in space, movement of the rotor 6 is possible within the elastic restraints imposed by members $E_1$ to $E_4$; similarly, movement of the masses is possible within the same elastic restraints if the rotor is held fixed in space. This is also the case with the apparatus shown in FIGS. 1 to 3, and is in contrast in particular to the apparatus shown in U.S. Pat. No. 3,211,011 where the radial members connecting the weights to the rotor are required to transmit centrifugal thrust and thus cannot vary in length enough to permit the same effect in any substantial degree.

Take joint mass $(M_1 + M_3)$ and consider a rotor deflection $r_1$ about the OX axis and deflection $s_1$ of the joint mass about the same axis. The externally-applied torque on the rotor about the OX axis can now be written:

$$-2K_r \cdot r_1 - K_b \cdot r_1 \; K_t \cdot r_1 + 2K_z \cdot s_1 \quad (xviii)$$

where $K_r$ is a constant defining the torque transmitted by member $E_1$ to the rotor about the OX axis for unit change in $r_1$, $K_z$ is a constant defining the torque transmitted by member $E_1$ to the joint mass about the OX axis for unit change in $s_1$, and $K_b$ and $K_t$ are as defined in the analysis of the gyroscope of FIGS. 1 to 3.

If the apparatus is to behave as a free rotor gyroscope, the torque defined by expression (xviii) must be zero, as must the similar torque about the OY axis. Hence equation:

$$(2K_r + K_b + K_t) \cdot r_1 = 2K_z \cdot s_1 \quad (xix)$$

must be satisfied. The equation of motion of the joint mass about the OX axis may now be written:

$$a\ddot{s} + (c-b)n^2 \cdot s_1 = -2K_{ms} \cdot s_1 + 2K_{mr} \cdot r_1 \quad (xx)$$

where $a$, $b$ and $c$ are the principal moments of inertia of the joint mass about axes OX, OY and OZ respectively, $n$ is as before, $K_{ms}$ is a constant defining the torque transmitted to the joint mass about the OX axis by $e_1$ and $E_1$ for unit change in $s_1$, and $K_{mr}$ is a constant defining the torque transmitted to the mass about the OX axis by $E_1$ for unit change in $r_1$. Now from (xix) and (xx) we may write:

$$a\ddot{s}_1 + (c-b)n^2 s_1 = -2K_{ms} \cdot s_1 + 2K_{mr} \cdot \left(\frac{2K_s}{2K_r + K_b + K_t}\right) \cdot s_1 \quad (xxi)$$

and writing $s_1$ as as $s_0 \cdot \cos nt$ it follows that:

$$-an^2 + (c-b)n^2 - 2K_{ms} + \frac{2K_{mr} \cdot 2K_s}{2K_r + K_b + K_t}, \text{ or}$$

$$n^2 = \left\{ \frac{2K_{ms} - \frac{2K_{mr} \cdot 2K_s}{2K_r + K_b + K_t}}{(a+b-c)} \right\} \quad \text{(xxii)}$$

A similar equation is obtainable for a deflection about the OY axis.

Similarities will readily be seen between equation (xxii) and equations (xv) and (xvi) in the analysis of the gyroscope shown in FIGS. 1 to 3.

Figure 5:
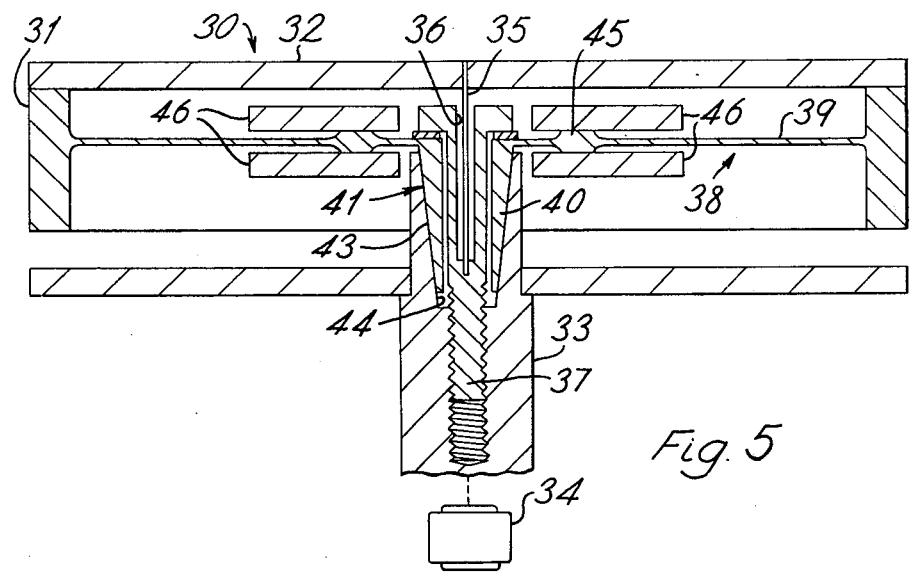
FIG. 5 is an axial section through the assembly of the rotor and driving element of another gyroscope.
Figure 6:
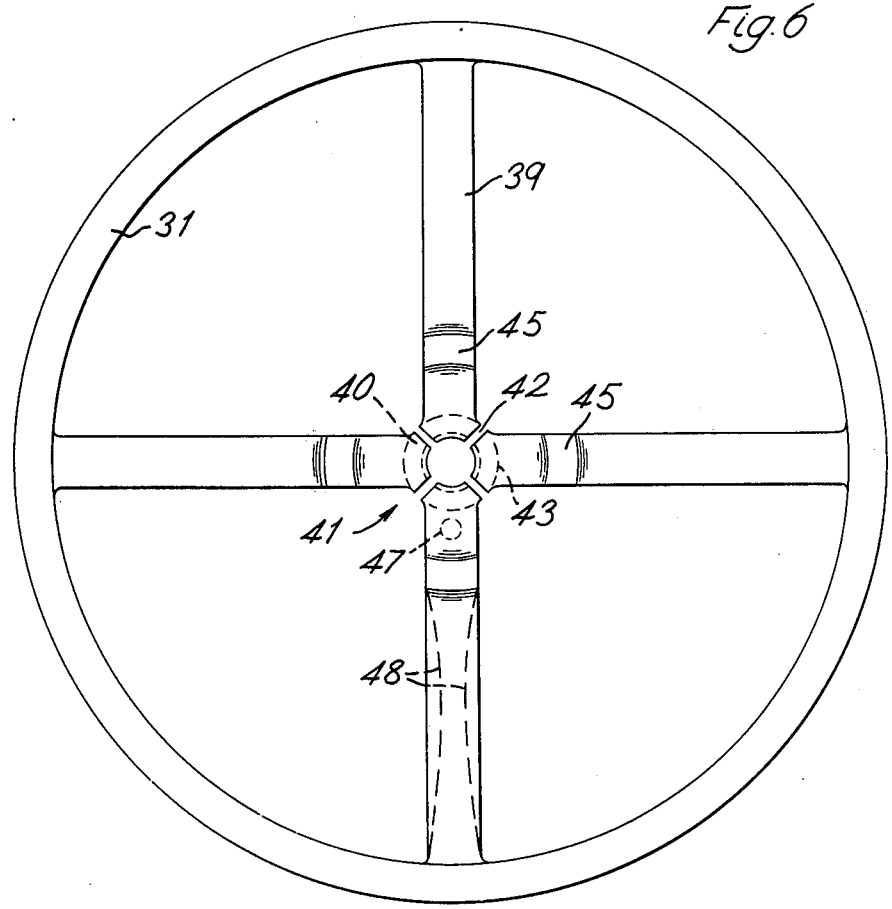
FIG. 6 is a plan view of the mass-carrying structure of the gyroscope of FIG. 5.

In a gyroscope with the alternative assembly of rotor and driving element shown in FIGS. 5 and 6, a rotor 30 commprising an outer wall 31 and an end plate 32 is connected elastically to the shaft 33 of a driving element, (which includes the motor shown diagrammatically at 34) in two ways. First by a thin shaft 35, similar in function to support bar 14 of the previous Figures. Shaft 35 is mounted at the base of a bore 36 formed in a bolt 37 which engages coaxially with shaft 33. Second by means of a mass-carrying structure 38 comprising four identical spokes 39. At its outer end, each spoke is attached to (or merges integrally with) the outer wall 31 of rotor 30. At its inner end each spoke is attached to (or is similarly formed integrally with) one sector 40 of a split boss 41 having gaps 42 between the sectors and a tapered outer surface 43. Bolt 37 secures boss 41 within a tapered cavity 44 in shaft 33, and since the taper of the cavity is less than that of the boss tightening of bolt 37 increases the tension in spokes 39 and thus affords an additional means of adjusting the tuning condition of the apparatus, since the tension in the spokes affects the constants of the equation of motion already discussed with reference to previous Figures. The spokes 39 have raised portions 45 to which masses 46, comparable with the masses M of previous Figures, may be fastened. The portions 45 are of small extent when measured in a radial direction, while the masses 46 are longer in that direction. By fastening the masses to these raised portions, rather than to the main bodies of spokes 39, the capacity of each spoke as a whole to flex is less impaired and there is more scope for adjusting the precise radial position of each mass on its spoke without altering the vibratory characteristic of that spoke. FIG. 6, from which the masses 46 are omitted, shows also in dotted lines how spokes 39 may be formed with apertures 47 or shaped as at 48 to modify the vibration of their attached masses.

FIGS. 5 and 6 show a design in which the radial connection between rotor and driving element not only allows for easy adjustment of the tension of the spokes but is also a one-piece construction and may easily be of one piece with the rotor also, which leads to ease of manufacture and may help to improve the concentricity and balance of the rotor.

The analysis already given has thus shown that by connecting the rotor to the shaft by means of a spring-mass-spring system, and spinning the shaft at a certain speed, external restoring torques acting upon the rotor can be brought to zero. There is an analogy between the mechanism which allows this result and the behaviour of a body attached to a support by a stretched linkage comprising a spring of constant $K_1$ attached to the support, then a mass M, and then a second spring attached at its other end to the body. If the body is moved sinusoidally towards and away from the support, the force transmitted to the body can be shown to be zero when the input frequency is equal to $\sqrt{(K_1/M)}$.

The invention thus demonstrates that the torque transmitted to the rotor is a function of the frequency at which the spokes vibrate, and that at a tuning condition coinciding with a certain rotor speed the spokes and the center support bar 14 vibrate at such a frequency that the total applied torque to the rotor is zero. A study of test results indicated that the rotor's natural frequency, that is to say the frequency of the wobbling oscillation of the rotor set up by some change of motion of the gyroscope about an axis perpendicular to the spin axis, diminishes as the spin speed $n$ increases and finally passes through zero. This means that a point along the OZ axis on the rotor will normally tend at low values of $n$ to describe a circle with a rotation in the direction opposite to that of the spin rotation. As $n$ increases, the rate at which this circle is described decreases until, at the tuning speed, the rotation apparently ceases. As $n$ increases still further the point would begin to describe a circle again, but this time in the same direction as the rotor spin. This phenomenon offers a convenient experimental method of checking the speed at which the tuning condition exists.

It will be apparent that the theoretical analysis given in the foregoing text is based on certain customary and reasonable assumptions, for instance that deflections are small and that the torque from the motor 5 is equal to the bearing friction and air drag. Also that each spoke behaves as a long thin beam so that the torque it transmits are proportional to deflection and independent of speed, that the spokes themselves are massless and that the masses attached to them are small in physical dimension. Comparable theory can be derived to show that a tuning condition similar to that demonstrated by equation (xvii) may exist, and that the spokes may still act as spring-mass-spring systems, if the spokes are treated as possessing mass, and if the masses that vibrate to generate the necessary torque to oppose the external restoring torques are those of the spokes themselves. Such cases also fall within the present invention.

We claim:

1. Gyroscopic apparatus in which:
   a driving element is rotatable about a driving axis;
   a rotor has its center of gravity on said driving axis;
   there is an elastic connection between said rotor and said driving element;
   said elastic connection constrains said rotor to rotate normally in a plane lying at right angles to said driving axis, but permits it to deflect from said plane against elastic resistance;
   said elastic connection includes a plurality of similar structures joining said rotor to said driving element and capable of exerting torque upon said rotor when deflected;
   said structures each comprise a mass, a first member connecting said mass to said driving element and a second member connecting said mass to said rotor;
   said first and second members are resilient in directions substantially parallel to said driving axis, whereby said masses have freedom to move in similar directions against elastic restraint; and
   said restrained movement of said masses results in variation of said torque exerted by said structures upon said rotor when deflected, whereby at certain rotor speeds the resultant of said torques substantially compensates for any other external torques to which said rotor is subject.

2. Gyroscopic apparatus according to claim 1, in which the entire spans of said structures and said masses carried by said structures lie substantially in the plane of rotation of said rotor including its center of gravity.

3. Gyroscopic apparatus according to claim 2, in which said structures comprise lightweight and resilient spokes, each carrying said mass located at a point along its length, whereby the motion of said rotor when deflected from its normal plane of rotation causes said loaded spokes to oscillate as spring-mass-spring systems whereby the said carried masses oscillate in a direction substantially parallel to said driving axis to set up said compensating torques.

4. Gyroscopic apparatus according to claim 3 in which the length of each spoke between said carried mass and said driving element is stiff in torsion.

5. Gyroscopic apparatus according to claim 1 in which said elastic connection also includes a thin shaft connecting said driving axis of said driving element to the axis of said rotor and normally coaxial with both of said axes but able to flex elastically to allow these two said axes to move out of alignment.

6. Gyroscopic apparatus according to claim 3 in which there are at least two pairs of said spokes, the spokes of each pair being located diametrically opposite to each other about said driving axis.

7. Gyroscopic apparatus according to claim 6, in which the said masses carried by each of a said diametrically-opposite pair of spokes are rigidly connected by connecting members so that said masses and their rigid connecting members oscillate as a joint mass when said rotor is deflected from its said normal plane.

8. Gyroscopic apparatus according to claim 1 in which said plurality of mass-carrying structures radiate from a split-tapered central member co-operating with a tapered member on said driving element, whereby by varying the engagement of the two tapers the radial tension of said structures and the character of said motion of said carried masses may be varied also.

* * * * *